United States Patent [19]

Decavele

[11] 4,408,119

[45] Oct. 4, 1983

[54] INDIVIDUALIZED PORTABLE OBJECT SUCH AS A CREDIT CARD

[75] Inventor: Dominique Decavele, Chevreuse, France

[73] Assignee: Transac-Alcatel-Compagnie pour le Development des Transactions Automatiques, Paris, France

[21] Appl. No.: 282,317

[22] Filed: Jul. 10, 1981

[30] Foreign Application Priority Data

Jul. 11, 1980 [FR] France .................. 80 15484

[51] Int. Cl.³ .................. G06K 3/00; G06K 5/00
[52] U.S. Cl. .................. 235/382; 235/380; 235/381
[58] Field of Search ............ 235/382, 382.5, 380, 235/381; 340/825.31, 825.33, 568

[56] References Cited

U.S. PATENT DOCUMENTS

| | | | |
|---|---|---|---|
| 3,866,173 | 2/1975 | Moorman | 235/382 |
| 3,906,460 | 9/1975 | Halpern | 235/382 |
| 4,092,524 | 5/1978 | Moreno | 235/419 |
| 4,105,156 | 8/1978 | Dethloff | 235/441 |

*Primary Examiner*—Harold I. Pitts
*Attorney, Agent, or Firm*—Sughrue, Mion, Zinn, Macpeak and Seas

[57] ABSTRACT

The object requires a would-be user to supply an authorization code within a predetermined number of attempts, otherwise the object is invalidated. The object has at least one memory (1) in which the results of attempts at use are stored in permanent binary form. The object also includes memory write means (3) and discriminator means (9). These are arranged to distinguish between an un-interrupted sequence of said predetermined number of failed attempts (in which case the object is invalidated) and a sequence of failed attempts which is interrupted by at least one successful attempt.

14 Claims, 3 Drawing Figures

INDIVIDUALIZED PORTABLE OBJECT SUCH AS A CREDIT CARD

The present invention relates to individualized portable objects such as credit cards which require a would-be user to supply an authorization code before the object can be used. The invention applies to objects of this kind which include memory means for storing the results of attempts at use on the object itself in a permanent binary form, for the purpose of invalidating the object after a predetermined number of failed attempts at use.

BACKGROUND OF THE INVENTION

In several applications, the supplier of the object allows the object to be used by the user for a limited number of occasions only. Each time the object is used, the fact of its use is recorded by permanently (and often irreversibly) modifying one bit of data held by the object.

It is in the supplier's interest and/or the user's interest, that the data stored on the object should not be capable of illicit access and/or modification.

Various techniques have therefore been evolved for preventing illicit modification of the data stored on the object and for preventing such normally secret data becoming known.

In one known system, where the objects in question are credit cards, and where use of the object requires the user to supply a code specific to the object, precautions are taken to prevent the code from being found out by trial and error testing of all possible codes. This is done by limiting the number of trials that any one reader will tolerate, and by the reader invalidating the card after a predetermined number of failures.

In a variant of the above technique the number of failed attempts is stored on the card, which is then invalidated after said predetermined number of failed attempts. However, storing failed attempts on the card suffers from the drawback of failing to distinguish between an un-interrupted sequence of failed attempts (assumed to be fraudulent) and the same number of failures interspersed by successful attempts (in which case the user is deemed to be clumsy or absent-minded rather than fraudulent).

Another fraudulent approach is to attempt to discover the authorization code by systematic testing using reading apparatus which does not make a record of failed attempts; such apparatus being, for example, in the form of standard reading apparatus which has been illicitly modified.

SUMMARY OF THE INVENTION

The present invention provides an individualized portable object which requires a user to supply an authorization code in order to use the object, and which includes memory means in which the results of attempts at use are stored permanently in binary form for the purpose of rendering the object invalid after a predetermined number of failed attempts at use, wherein the object further includes memory write means and discriminator means for controlling the memory write means as a function of the results of attempts at use prior to a current attempt, said means being arranged to distinguish an un-interrupted sequence of said predetermined number of failed attempts from a sequence including the same number of failed attempts but interrupted by at least one successful attempt, and to invalidate the object only after an un-interrupted sequence of said predetermined number of failed attempts.

Preferably said memory write means are arranged to write a distinctive recording indicative of a first successful attempt after a failed attempt, and wherein said discriminator means are arranged to read at least one recording of an attempt preceding the current attempt.

The object may include an auxiliary memory in addition to said memory means, said auxiliary memory being used to store a record of failed attempts and of first successful attempts following a failed attempt, said memory write means being arranged on each failed attempt to write in permanent form a bit of a first value indicative of the failed attempt in the next free location in said auxiliary memory, and on the first successful attempt following a failed attempt to ensure that a bit of a second value opposite to the first is stored in the next free location in the auxiliary memory and that a bit of said first value is written in the subsequent free location.

Alternatively all attempts at use can be stored successively, in which case said memory write means may be arranged to register every attempt by permanently modifying the next free location but one from the previously modified location, and to register every successful attempt by additionally modifying the location in between.

BRIEF DESCRIPTION OF THE DRAWINGS

Two embodiments of the invention are described by way of example with reference to the accompanying drawings in which.

DETAILED DESCRIPTION

Figure 1:
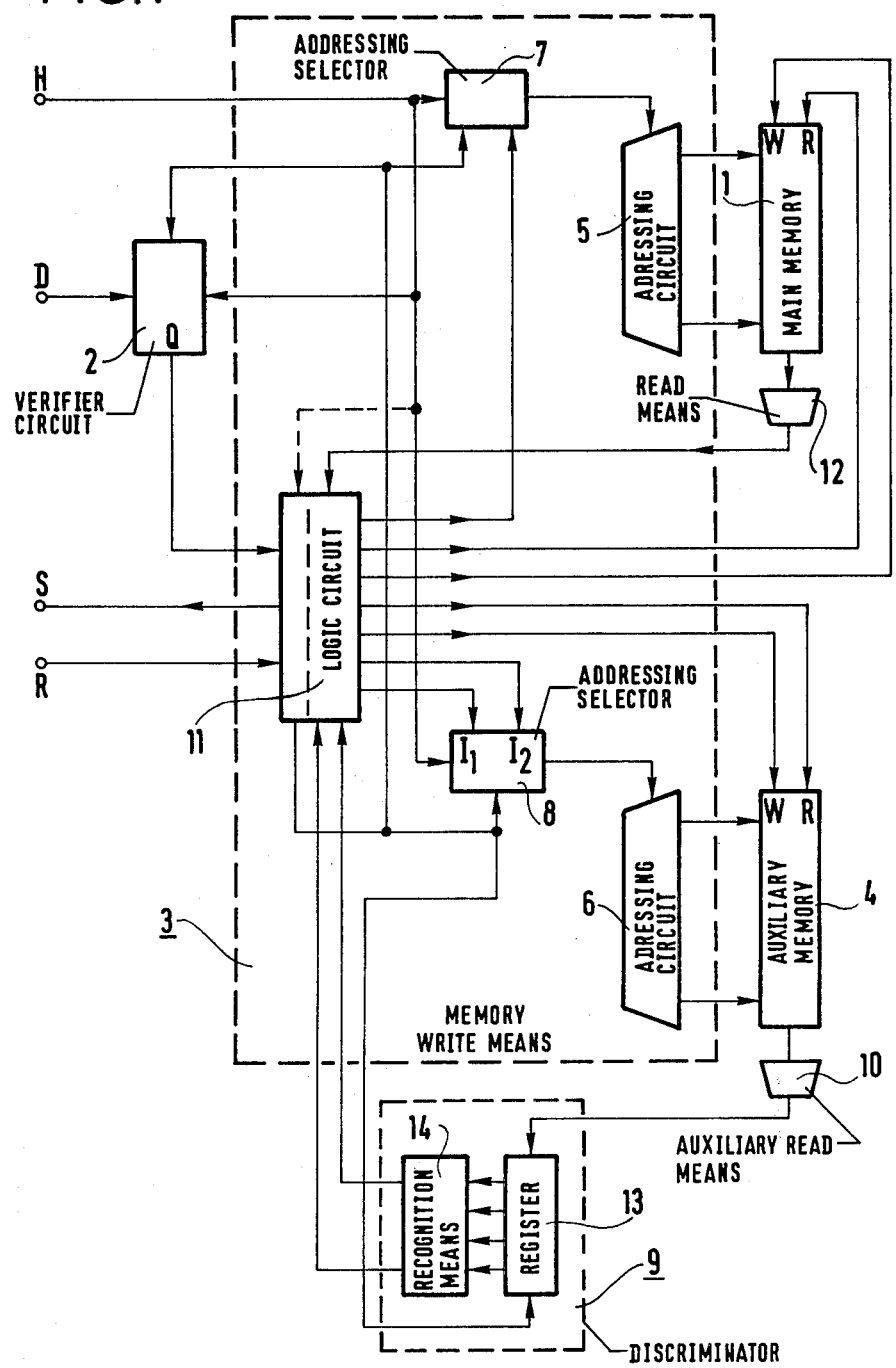
FIG. 1 is a block diagram of the main features of a first portable individualized object in accordance with the invention.

FIG. 1 shows an individualized portable object intended to co-operate with a terminal (not shown), and for this purpose it includes a plurality of accesses such as those referenced H, D, R and S.

The accesses enable the object to be suppllied with power, and also enable the object to exchange data with a terminal to which it may be connected. The accesses may be embodied by any conventional means including metallic connection, electro-magnetic coupling, or any other suitable means.

In conventional manner, the individualized portable object is shaped like a credit card. It includes a main memory 1 for permanently storing data in binary form. In normal operation, the data can be written only once. Two forms of such memory are well known: there are programmable read only memories (PROM) or, possibly under certain circumstances, reprogrammable read only memories (REPROM); and there are memories in which data is stored by permanently destroying a member such as a diode or a fusible link.

Access to the main memory 1 from the terminal is controlled by a verifier circuit 2 of conventional structure. The verifier circuit 2 is preferably included inside the individualized object, but in some circumstances it could be in the terminal. The verifier circuit 2 is responsive to an access authorization code that the user must supply each time he wishes to use the object. Each code supplied by the user is transmitted to the verifier circuit 2 which compares it with the authorization code particular to the object in question and stored therein. The verifier circuit 2 supplies a code recognition signal or a code non-recognition signal as the case may be. Generally speaking, the terminal to which the object is connected receives the user generated code by means of a keypad, and it then transmits the code to the verifier circuit in the object via a data access D shown in the figure. Naturally other means of code data entry could be invisaged.

The code recognition or non-recognition signal is transmitted from the verifier circuit 2 to memory write means 3 which control access to the main memory 1. The result of the comparison performed by the verifier circuit 2 is transmitted to the terminal by a data outlet S which may optionally be constituted by the same circuits as the data inlet D.

In the example shown in FIG. 1 the individualized portable object also includes an auxiliary memory 4 of the same type as the main memory 1. The auxiliary memory 4 is used to keep a tally of attempts to access the main memory 1, and in particular to keep a record of failed attempts. For this purpose, the memory write means 3 includes memory addressing circuits 5 & 6 and also includes connections to read and write enable inputs R and W respectively of the memories 1 and 4.

In conventional manner the addressing circuits 5 and 6 are controlled by respective addressing selectors 7 and 8 which are also included in the memory write means 3. The individualized portable object further includes discriminator means 9 which are connected to the output of the auxiliary memory 4 by memory read means 10 in such a manner as to be able to determine whether the preceding attempt(s) at accessing the main memory were successful or not, in order to detect fraudulent attempts by successively trying out different code combinations.

The memory write means 3 further include a logic circuit 11 connected to outputs from the discriminator means 9 and from the verifier circuit 2. Outputs from the logic circuit 11 are connected to the addressing selectors 7 and 8 and to the read and write enable inputs R and W respectively of the memories 1 and 4.

Thus, the logic circuit 11 receives the recognition or non-recognition signal from the verifier circuit 2 and also receives signals from the discriminator means 9. The signals from the discriminator means 9 are indicative of whether or not previous attempts at access were successful or had failed for an un-interrupted sequence of successive failures.

In a manner which is explained in more detail with reference to FIG. 2, the discriminator means 9 produce an invalidation signal which is transmitted to the terminal connected to the object via the logic circuit 11 and the access S in the event that the signal representative of the preceding attempts indicates that the predetermined number of failures has taken place in succession. This is to make it possible, for example, to give the user a signal indicating that the object is no longer valid. When the logic circuit 11 receives a recognition signal from the verifier circuit 2 simultaneously with the signal indicative of success in the preceding attempts from the discriminator means 9, the logic circuit 11 applies a first write signal on the write input W of the main memory 1. The logic circuit 11 produces a second write signal on the write input W of the auxiliary memory 4 and on the input $I_1$ of the addressing selector 7 in the event that it receives a recognition signal simultaneously with a signal indicative that the preceding attempt had failed. The logic circuit 11 produces a third write signal on the input W of the auxiliary memory 4 and on the second input $I_2$ of the addressing selector 7 when it receives a non-recognition signal from the verifier circuit 2.

The first write signal changes the data in the address immediately following the preceding address to be written in the main memory 1, which requires the read means 12 associated with the main memory 1 to be capable of detecting the address of said previously written data to cause the memory write means to address the next data location by means of the addressing selector 7 and the addressing circuit 5.

The second write signal modifies the second data location following the last location to be modified in the auxiliary memory 4, this requiring the auxiliary read means 10 and the discriminator means 9 to be capable of detecting the position of the last data location to be modified and to be consequently capable of addressing the said second data location via the addressing selector 8 and the addressing circuit 6.

The third write signal modifies the data location immediately following the previous data location to be modified in the auxiliary memory 4 by a technique similar to that mentioned above.

In a similar manner the second data location of the auxiliary memory 4 is modified during manufacture before the object is used for the first time.

The discriminator means 9 include a register 13 connected to the output of the read means 10, and a recognition means 14 connected to the outputs from the register 13. In the example shown in FIG. 2, the register 13 is a four-bit, serial-in, parallel-out register. The data input of the register 13 is connected to the output from the read means 10 which is constituted, for example, by a multiplexer with data inputs connected to different respective outputs from the memory in conventional manner. The addressing inputs of the multiplexer are connected to the addressing selector constituted, for example, by a multi-stage binary counter 34 and its strobe input is connected the the clock input H of the object via a clock circuit 15 arranged to control the activation instants of the various members of the object in a sutable manner.

The register 13 is connected to the clock circuit 15 via a clock input, and the binary data which it receives on its data input is transmitted over its four stages at the rate of clock signals H3.

Figure 2:
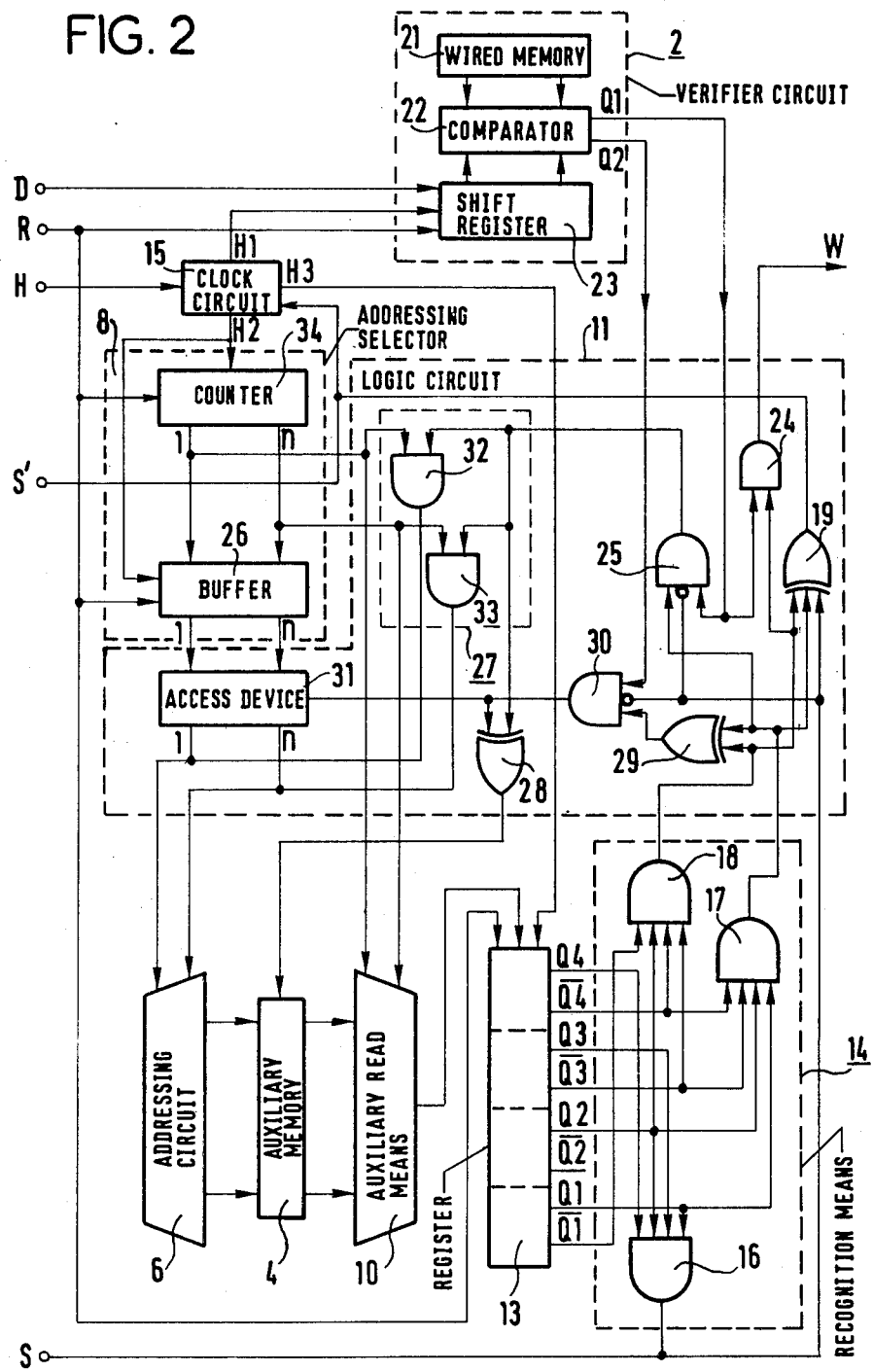
FIG. 2 is a more detailed diagram of one embodiment of the invention.

In the example shown in FIG. 2 each stage of the register 13 is provided with a pair of complementary outputs Q and $\overline{Q}$ which are connected to the recognition means 14 which, in this case, is constituted by three four-input AND gates 16, 17 and 18.

The AND gate 16 is connected to the outputs of the four stages of the register 13 in such a manner as to detect a succession of four modified binary data locations, and in the example shown, this is done by connecting the Q outputs of each of the stages of the register 13 to respective inputs of the AND gate 16, thus producing a signal indicative of four failed attempts in succession. The output from the AND gate 16 has a logic one when the register 13 contains four binary ones, and such a signal constitutes the instruction for rendering the object invalid. In the present example this signal is transmitted to one input of an exclusive-OR gate 19 which stops the counter 34 via the clock circuit 15 and which prevents any further operation of the object via its output S.

The AND gate 17 is connected to outputs $Q_1$ and $Q_2$ of the furthest two stages of the register 13 from its input, and to the complemented outputs $\overline{Q_3}$ and $\overline{Q_4}$ of the other two stages, in such a manner as to produce a binary signal representative of the combination 0011 which indicates, by virtue of its two ones, that previous attempt at access was a failure, and by virtue of its two zeros, that there remain modifiable data locations in the auxiliary memory 4.

The AND gate 18 is connected to the output $Q_2$ and to the complemented outputs $\overline{Q_1}$, $\overline{Q_3}$ and $\overline{Q_4}$ in such a manner as to produce a binary signal representative of the combination 0010 which indicates, by virtue of its one zero, that previous attempt at access was a success, and by virtue of its two zeros, that there remain modifiable data locations in the auxiliary memory 4. Naturally, it is possible that all preceding attempts were successes, since only failed attempts and successful attempts immediately following a failed attempt are recorded in the auxiliary memory.

In a straightforward manner, the counter 34 of the address selector 8 successively addresses the various memory locations of the auxiliary memory 4 in which the binary data is stored. This is done each time the object is used. The counter 34 is driven by clock pulses received from an external clock via input H to the clock circuit 15. The clock circuit 15 resets the counter 34 to zero on each occasion the object is used. In the present example the successive addresses are transmitted firstly via a multiplexer 10 and secondly via the write addressing unit 6 of the auxiliary memory. Thus the register 13 has all the data in the auxiliary memory 4 flowing through it until one of the three above-mentioned combinations appears. On reception of one of said combinations, the counter 34 is stopped via the clock circuit 15 and the exclusive OR gate 19 whose three inputs are connected to the outputs from the three AND gates 16, 17 and 18. The counter retains the address corresponding to the data contained in the stage of the register 13 which is nearest to its input, while the buffer register 26 connected to the output of the counter 34 stores the prvious address.

Simultaneously the verifier circuit 2 compares the data it receives over the input D with the access code to the object, and it provides the result of said comparison in the form of a binary recognition or non-recognition signal.

In the present example the verification circuit 2 comprises a comparator 22 with one set of parallel inputs connected to a hard wired memory 21 which contains the user authorization code.

The other set of parallel inputs to the comparator 22 is connected to parallel outputs from a serial-in parallel-out shift register 23 connected to the data input D. The comparator 22 is controlled by the clock H via the clock circuit 15, as is the shift register 23 whereby the shift register 23 retains the binary data it receives at the beginning of an operation throughout at least the recognition period, and maybe for the whole time that the object remains connected to the terminal.

In the present example, the comparator 22 provides a recognition signal of logic value one on an output $Q_1$ and a non-recognition signal of logic value one on an output $Q_2$. These signals stay fixed throughout an operatin as indicated above. The $Q_1$ output from the comparator 22 is connected to inputs to AND gates 24 and 25, with the AND gate 24 having a second input connected to the output of AND gate 18 and its output connected to the write enable input W of the main memory 1 which is made in the same way as the auxiliary memory 4 and is therefore not described in further detail. The AND gate 24 thus ensures that a data bit is modified in the main memory whenever the attempt prior to the current attempt was successful.

The AND gate 25 has a second input connected to the output of the AND gate 17 and a third, inverting input connected to the output of the AND gate 16. Its output is connected to the write enable input of the auxiliary memory 4 via an exclusive OR gate 28, and to the control input of an access controlling device 27 (in this case a set of AND gates such as 32 and 33). The access controlling device 27 connects the parallel outputs of the counter 34 to the inputs of the addressing circuit 6 whenever a current attempt follows one or more failures. It causes the data location whose content appears in the stage of the register 13 nearest to its input to be modified, leaving the data at the immediately preceding address un-modified.

The outputs from AND gates 17 and 18 are also connected to the inputs of an exclusive OR gate 29 whose output is connected to one of the two non-inverting inputs to an AND gate 30 whose other non-inverting input is connected to the $Q_2$ output from the the comparator 22 and whose inverting input is connected to the output from the AND gate 16. The output from the AND gate 30 is connected to the write enable input of the auxiliary memory 4 via an exclusive OR gate 28 and to the control input of an access controlling circuit 31 identical with the access controlling circuit 27. The access controlling circuit 31 connects the parallel outputs from the buffer register 26 to the parallel inputs of the addressing unit 6 whenever the comparator 22 produces a non-recognition signal, thereby addressing the data location whose contents is present in the second stage of the register 13 from its data input. This address is the address stored in the buffer register 26.

In conventional manner, the signals produced by the AND gates 16, 17 and 18 are transmitted to the terminal via a set of outputs S, S' so that the terminal can perform whatever action is required of it in each case.

Figure 3:
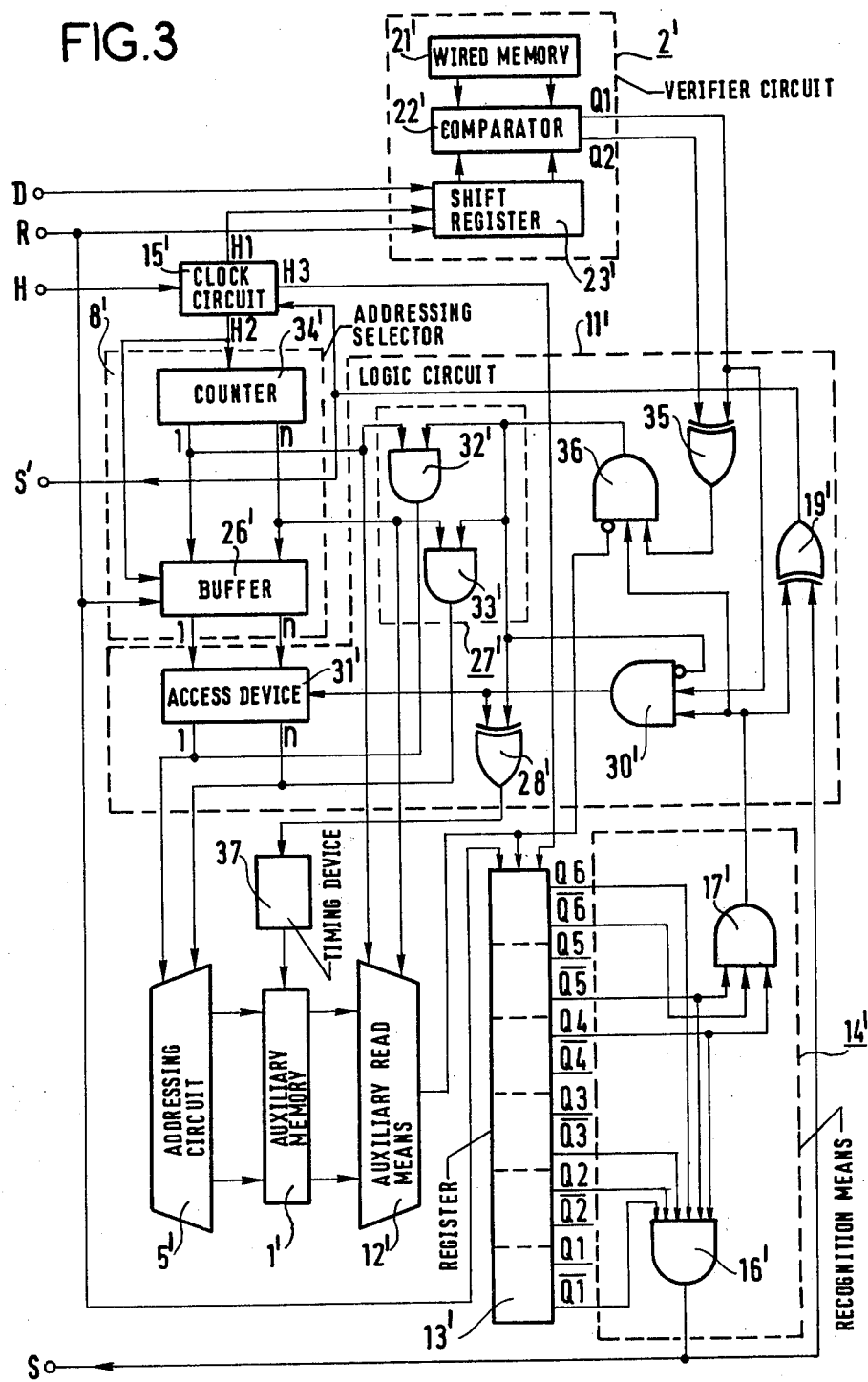
FIG. 3 is a diagram similar to FIG. 2 showing details of a second embodiment of the invention.

The embodiment shown in FIG. 3 has several points in common with that shown in FIG. 2, and identical components are given reference numerals that differ only in the addition of the symbol ', e.g. the verifier circuits are 2 and 2'.

Attempts at use are stored successively in a single memory 1'. The memory write means 3' are arranged to store all attempts at use by permanently modifying the next binary data location but one after the previously modified bit, and all successful attempts by modifying the in between bit as well.

This leads to the auxiliary memory 4 being unnecessary, and to various consequential modifications to the circuit shown in FIG. 2, without many of them being completely eliminated. Thus the register 13' performs a similar function to the register 13, the recognition means 14' a similar function to the recognition means 14 and the logic circuit 11' a similar function to the logic circuit 11.

As before, every attempt at use causes the memory, in this case the memory 1' to be read, and the reading is stopped if:

the AND gate 16' detects the appearance in the register 13' of the predetermined number of failed attempts, in this case three. Since each failed attempt is stored as a 01 combination this amounts the gate 16' being responsive to the combination $\overline{Q_1} Q_2 \overline{Q_3} Q_4 \overline{Q_5} Q_6$; or the AND gate 17' detects a combination 100 on register outputs $Q_4 \overline{Q_5}$ and $\overline{Q_6}$, where $Q_4$ is the last address to be modified and the addresses to be modified are contained in the counter 34' and the buffer register 26'.

Likewise the exclusive OR gate 19' is enabled by the invalidation signal issued by the AND gate 16' or by the recognition signal issued by the AND gate 17'. The signal issued by the exclusive OR gate 19' is transmitted to the clock circuit 15' in both cases the counter 34' is stopped as are the buffer register 26' and the register 13'.

The logic circuit 11' includes two AND gates 30' and 36 and two exclusive OR gates 28' and 35, in addition to the exclusive OR gate 19' in order to control writing in memory 1'.

The gate 35 is connected to both of the outputs from the comparator 22' to activate AND gate 36 after each comparison regardless of the result. The AND gate 36 is activated as soon as the last modified data location is detected in the memory 1' and an authorization signal is given by the read device 12' via an inverting input, which signal indicates that data location addressed for reading by the counter 34' has not been modified. Its value is confirmed by $\overline{Q_6}$.

Via the access device 27', the AND gate 36 enables writing in said unmodified location, which is two locations from the last modified location shown by $Q_4$.

The AND gate 36 also controls writing into memory 1' via a timing device 37, with the writing taking place in the above-indicated address.

After writing, the read device 12 indicates that the location to be modified has been modified, thereby closing the AND gate 36 and enabling the AND gate 31' which receives an inverted signal from the AND gate 36 derived from the signal generated by the read device 12, together with a signal from the AND gate 17' and the recognition signal $Q_2$ whenever the comparator 22 detects an authorized code.

The AND gate 30' causes the location preceding the the most recently modified location to be addressed for writing by activating the access device 31', thereby causing the contents of the buffer register 26' to be applied to the addressing unit 5'.

The AND gate 30' also causes the address stored in the buffer register 31' to be written to, by means of the exclusive OR gate 28' as for the command via the AND gate 36.

It should be observed that an object in accordance with the invention does not let a potential fraudsman know whether a given attempt will be recorded as a success or a failure before the result has been, in fact, recorded. Thus, in the first embodiment the same length of time is taken for sucessful and for unsuccessful attempts, leading to a single record; and in the second embodiment any attempt at interrupting the process of recording the result will either give no indcation of the nature of the attempt, or else will record it as a failure unless time is given for the writing process to be completed.

It should also be observed that supplementary information can be given to the user such as a warning that this is a last attempt. This side of the object has not been described in detail since it is not directly relevant to the present invention.

I claim:

1. An individualized portable object which requires a user to supply an authorization code in order to use the object, and which includes memory means in which the results of attempts at use are stored permanently and irreversibly in binary form for the purpose of rendering the object invalid after a predetermined number of failed attempts at use, wherein the object further includes memory write means; and discriminator means for distinguishing an un-interrupted sequence of said predetermined number of failed attempts from a sequence of failed attempts including the same number of failed attempts but interrupted by at least one successful attempt for controlling said memory write means as a function of attempts at use prior to a current attempt and for invalidating the object only after an un-interrupted sequence of said predetermined number of failed attempts.

2. An individualized portable object according to claim 1, wherein said memory write means are arranged to write a distinctive recording indicative of a first successful attempt after a failed attempt, and wherein said discriminator means are arranged to read at least one recording of an attempt preceding the current attempt.

3. An individualized portable object according to claim 2, including an auxiliary memory in addition to said memory means, said auxiliary memory being used to store a record of failed attempts and of first successful attempts following a failed attempt, said memory write means being arranged on each failed attempt to write in permanent form a bit of a first value indicative of the failed attempt in the next free location in said auxiliary memory, and on the first successful attempt following a failed attempt to ensure that a bit of a second value opposite to the first is stored in the next free location in the auxiliary memory and that a bit of said first value is written in the subsequent free location.

4. An individualized portable object according to claim 1, wherein attempts at use are stored successively, and wherein said memory write means are arranged to register every attempt by permanently modifying the next free location but one from the previously modified location, and to register every successful attempt by additionally modifying the location in between.

5. An individualized portable object according to claim 3, wherein said memory means is controlled by a verifier circuit responsive to a use authorization code, and wherein the discriminator means are arranged to provide respective signals representative of prior attempts that, failed in succession, and prior attempts that succeeded, said signals being generated from the stored data, and wherein the memory write means are arranged to provide:
   an invalidation command on receipt of said signal representative of a succession of prior failures;
   a first write command to said memory means on receipt both of said signal representative of a previously successful attempt and of a recognition signal from the verifier circuit;
   a second write command to the auxiliary memory on receipt both of said signal representative of a prior attempt that failed and of a recognition signal; and
   a third write command to the auxiliary memory on reception of a non-recognition signal from the verifier circuit.

6. An individualized portable object according to claim 5, wherein said discriminator means includes recognition means responsive to:

a succession of two modified bits in the auxiliary memory to produce said signal representative of a prior attempt that failed;

a succession of non-modified bits followed by a modified bit in the auxiliary memory to produce said signal representative of a previously successful attempt; and an un-interrupted succession of said predetermined number of modified bits in the auxiliary memory to produce said signal representative of prior attempts that failed in succession.

7. An individualized portable object according to claim 6, wherein the memory write means comprise:

a logic circuit connected to the verifier circuit and to the discriminator means, and arranged to produce said invalidation command and said memory write commands; and an auxiliary memory addressing selector connected to outputs from the logic circuit that provide said auxiliary memory write commands, and to the addressing inputs of said auxiliary memory, said addressing selector being arranged, on receipt of said third write command, to address the first non-modified bit location in the auxiliary memory after a sequence of modified bit locations, and on receipt of said second write command, to address the second non-modified bit location after a sequence of modified locations.

8. An individualized portable object according to claim 7, wherein the auxiliary memory comprises a succession of modifiable bit locations, and wherein the second bit location from the beginning of the succession is modified before the object is used.

9. An individualized portable object according to claim 6, wherein said recognition means comprises three logic units connected to the output from the auxiliary memory and respectively arranged to detect:

an un-interrupted succession of four modified bits;

an un-interrupted succession of two modified bits followed by two un-modified bits; and an un-interrupted succession of one un-modified bit followed by one modified bit and two un-modified bits; thereby producing said signals representative of prior attempts that: failed; failed in succession; and succeeded.

10. An individualized portable object according to claim 9, wherein the discriminator means includes a shift register with at least four stages inserted in between said logic units and the auxiliary memory, with parallel stage by stage connections between the shift register and the logic units.

11. An individualized portable object according to claim 10, wherein the auxiliary memory addressing selector includes a multi-stage synchronous counter including a clock input accessible from outside the object, and having parallel outputs that are connected to the addressing inputs of the auxiliary memory firstly via first access controlling means, and secondly via a buffer register with parallel inputs connected to the outputs from the synchronous counter and with parallel outputs connected to the addressing inputs of the auxiliary memory via a second access controlling means.

12. An individualized portable object according to claim 4, wherein said memory means is controlled by a verifier circuit responsive to an authorization code, and wherein the discriminator means includes a shift register with a number of stages equal to twice the predetermined number of failed attempts for invalidating the object, the shift register being connected to the output of said memory means and to inputs of recognition means suitable for providing a first signal indicative of said predetermined number of successive failed attempts and a second signal indicative of the last modified bit location in the succession of bit locations in said memory means.

13. An individualized portable object according to claim 12, wherein the memory write means include:

a logic circuit connected to the outputs of the verifier circuit and of the recognition means, and arranged to produce memory write signals; and a memory addressing selector connected to the logic circuit and to the addressing inputs of said memory means.

14. An individualized portable object according to claim 13, wherein the addressing selector includes a multi-stage synchronous counter having parallel outputs connected to the addressing inputs of said memory means firstly via a first access controlling means, and secondly via a buffer register with parallel inputs connected to the parallel outputs of the synchronous counter and with parallel outputs connected to the addressing inputs of said memory means via second access controlling means, identical to the first access controlling means and connected to provide access to the addressing inputs of said memory means whenever the first access controlling means is not providing such access.

* * * * *